US011880586B2

(12) United States Patent
Dubey et al.

(10) Patent No.: US 11,880,586 B2
(45) Date of Patent: Jan. 23, 2024

(54) STORAGE ARRAY REMOTE REPLICATION

(71) Applicant: Dell Products L.P., Round Rock, TX (US)

(72) Inventors: Utkarsh Dubey, Lucknow (IN); Numan Elahi Tramboo, Srinagar (IN); Prasant Kumar Padhi, Bangalore (IN); Thomas Watson, Richardson, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 17/514,085

(22) Filed: Oct. 29, 2021

(65) Prior Publication Data

US 2023/0137015 A1    May 4, 2023

(51) Int. Cl.
*G06F 3/06* (2006.01)
*G06F 3/00* (2006.01)

(52) U.S. Cl.
CPC .......... *G06F 3/0655* (2013.01); *G06F 3/0604* (2013.01); *G06F 3/065* (2013.01); *G06F 3/0653* (2013.01); *G06F 3/0679* (2013.01)

(58) Field of Classification Search
None
See application file for complete search history.

(56) References Cited

U.S. PATENT DOCUMENTS

2016/0366233 A1\* 12/2016 Le ........................... H04L 67/51
2022/0350497 A1\* 11/2022 Matosevich ........ G06F 16/1815

\* cited by examiner

*Primary Examiner* — Midys Rojas
(74) *Attorney, Agent, or Firm* — Krishnendu Gupta; Nikhil Patel (57) ABSTRACT

Aspects of the present disclosure relate to enabling storage array-based remote replication from containerized applications operating on one or more node clusters. In embodiments, a host executing one or more operations from a node cluster is provided an interface (e.g., an application programming interface (API)) to a storage array. Additionally, the host can be delivered resources to manage and monitor the storage array to perform one or more data replication services directly from the node cluster and via the interface. Further, data replications services are triggered in response to instructions issued by the host directly from the node cluster and via the interface.

12 Claims, 4 Drawing Sheets

STORAGE ARRAY REMOTE REPLICATION

BACKGROUND

Information processing systems increasingly utilize reconfigurable virtual resources to efficiently, flexibly and cost-effectively meet changing user needs. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system.

SUMMARY

Aspects of the present disclosure relate to enabling storage array-based remote replication from containerized applications operating on one or more node clusters. In embodiments, a host running, e.g., an application from a node cluster, is provided an interface (e.g., an Application Programming Interface (API)) to a storage array. Additionally, the host can be enabled to manage and monitor the storage array to perform one or more data replication services directly from the node cluster and via the interface. Further, data replications services are triggered in response to instructions issued by the host directly from the node cluster and via the interface.

In embodiments, the node cluster can be a Kubernetes cluster.

In embodiments, the host can be enabled to manage and monitor data replication services across one or more additional node clusters.

In embodiments, the interface can further be configured to augment at least one of the storage array's persistent volumes (PVs) or persistent volume claims (PVCs) with replication metadata. Furthermore, the replication metadata can include at least one of annotations and labels. Additionally, the replication metadata can be synchronized across one or more additional node clusters. Finally, each PV and PVC can also be bound to their related replication group.

In embodiments, a replication construct can be configured to group storage array volumes having related replication parameters. The interface can further be provisioned with the replication construct.

In embodiments, one or more endpoints can be established with access to a storage array resource.

In embodiments, the interface can be provisioned with access to one or more endpoints.

In embodiments, the interface can be configured with one or more storage class operational parameters to issue the storage array instructions via one or more endpoints.

In embodiments, the host can be enabled to discover a remote volume on the array corresponding to a host generated local volume, identify a storage protection group, create at least one new storage protection group, and delete at least one storage protection group, In embodiments, the host can be enabled to trigger one or more replication actions on the protection group, monitor a state of the protection group, notify one or more replication endpoints of support services, and probe the storage array for a replication status. Furthermore, the host can be enabled to perform the referenced operations using the interface and at least one of the endpoints. Additionally, one or more replication actions can include one or more failover actions and failback actions.

DETAILED DESCRIPTION

A business like a financial or technology corporation can produce large amounts of data and require sharing access to that data among several employees. As such, these companies often use storage arrays that deliver block-based storage, file-based storage, or object storage. Because a storage array uses multiple storage drives (e.g., hard-disk drives (HDD) and solid-state drives (SSD)), a company can scale (e.g., increase or decrease) and manage storage capacity more efficiently than storage solutions delivered by a server. In addition, a company can use a storage array to read/write data required by one or more business applications.

Additionally, a business can use a container orchestration (CO) platform to deploy software applications. The CO platform can include a container storage interface (CSI), defined by a current industry standard specification, allowing a containerized application to access storage array services.

For instance, the current industry-standard specification (CSI standard) defines a set of function signatures (e.g., rules or protocols) that enable containerized application access to backend storage array's services. However, neither current CO platforms nor the CSI standard includes a method to access replication services (e.g., via an interface like an API). Specifically, the CSI standard only defines rules allowing containerized applications to request one or more of the following storage services: create a virtual storage volume, publish a virtual storage volume, mount a virtual storage volume on the node or node cluster hosting the containerized application, unpublish a virtual storage volume, delete a virtual storage volume, create virtual storage snapshots, and clone a virtual storage volume.

Because the CSI standard does not define rules for native storage array access, containerized applications can neither receive remote array-based data replication services nor data disaster recovery services. As such, if a storage array becomes unavailable, containerized applications experience data unavailability events.

Furthermore, without native array access, containerized applications cannot receive data replication services. Thus, a containerized application cannot replicate data across arrays to receive load balancing services during intensive workload events. Additionally, a containerized application cannot create backups to recover lost data caused by a loss of a storage array due to a disaster event. The disaster event can include a natural disaster (e.g., flood, earthquake, etc.) or other disasters (e.g., terrorist attacks, and the like). Further, Embodiments of the present disclosure provide containerized applications with storage array-based remote data replication or disaster recovery services as described in greater detail herein.

Figure 1:
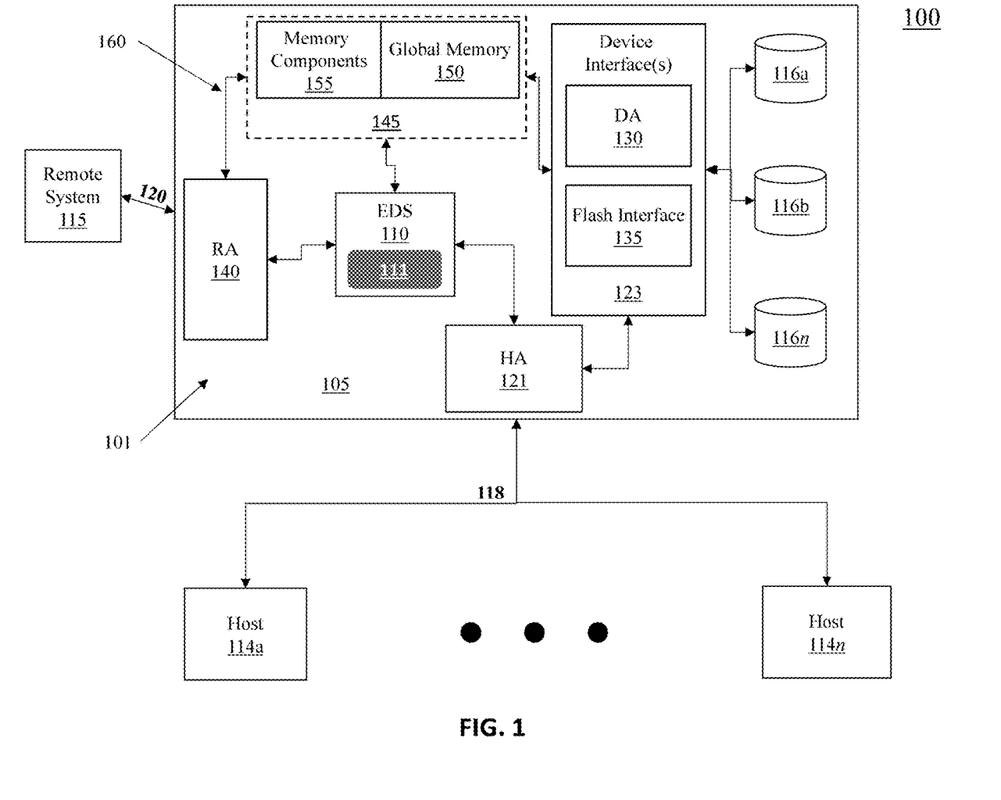
FIG. 1 is a block diagram of a storage array in accordance with embodiments of the present disclosure.

Regarding FIG. 1, a system 100 includes a storage array 105 with components 101 configured to perform distributed file storage services. In embodiments, the array 105 can include internal communication channels 160, communicatively coupling the array's elements 101. The communication channels 160 can include Fibre channels, internal busses, or communication modules. For example, the array's global memory 150 can use the communication channels 160 to transfer data or send other communications between the array's components 101.

In embodiments, the array 105 and one or more devices can form a network. For example, the array 105 and host systems 114a-n can define a first communication network 118. Further, the first network's topology can have the hosts 114a-n and the array 105 physically co-located or remotely located from one another. Likewise, the array 105 and a remote system 115 can define a second communication network 120. The networks 118,120 can be a wide area network (WAN) (e.g., Internet), local area network (LAN), intranet, Storage Area Network (SAN), and the like.

In further embodiments, the array 105 and other networked devices (e.g., the hosts 114a-n or the remote system 115) can send/receive information (e.g., data) using a communications protocol. For example, the communications protocol can include a Remote Direct Memory Access (RDMA) I, Remote Data Facility (SRDF), TCP, IP, TCP/IP, SCSI, Fibre Channel, Remote Direct Memory Access (RDMA) over Converged Ethernet (ROCE), Internet Small Computer Systems Interface (iSCSI), NVMe-over-fabrics (e.g., NVMe-over-ROCEv2 and NVMe-over-TCP) protocols, and the like.

The networked devices 105, 114a-n, 115, and the like can connect to the networks 118,120 using a wired/wireless network connection interface, bus, data link, and the like. Further, the networks 118, 120 can include communication nodes that enable the networked devices to establish communication sessions. For example, communication nodes can include switching equipment, phone lines, repeaters, multiplexers, satellites, and the like.

In embodiments, the array's components 101 can receive and process input/output (IO) workloads. An IO workload can include one or more IO requests (e.g., read/write requests or other storage service-related operations) originating from the hosts 114a-n or remote system 115. For example, one or more of the hosts 114a-n can run an application that requires a read/write of data to the array 105.

In embodiments, the array 105 and remote system 115 can include a variety of proprietary or commercially available single or multi-processor systems (e.g., an Intel-based processor and the like). Likewise, the array's components 101 (e.g., HA 121, RA 140, device interface 123, and the like) can include physical/virtual computing resources (e.g., a processor and memory) or require access to the array's resources. For example, the memory can be a local memory 145 configured to store instructions, executed by a processor to perform a storage array operation.

In embodiments, the array 105 can include a host adapter (HA) 121 (e.g., a Fibre Channel Adapter (FA)) that manages communications and data requests between the array 105 and any other networked device (e.g., the hosts 114a-n). For example, the HA 121 can direct one or more received IOs to an array component 101 for further storage processing. In embodiments, the HA 121 can direct an IO request to the array's device interface 123. The device interface 123 can manage the IO request's read/write data operation requiring access to the array's data storage devices 116a-n. For example, the data storage interface 123 can include a device adapter (DA) 130 (e.g., storage device controller), flash drive interface 135, and the like that controls access to the storage devices 116a-n. Likewise, the array's Enginuity Data Services (EDS) processor 110 can manage access to the array's memory and storage services. For example, the EDS 110 can include a replication manager 111 that coordinates data replication and disaster recovery services. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116a-n can have distinct performance capabilities. For example, the storage devices 116a-n can include at least one HDD, slow persistent storage capabilities, and at least one SSD, and fast persistent storage capabilities. Likewise, the array's local memory 145 can include global memory 150 and memory components 155 (e.g., register memory, shared memory constant memory, user-defined memory, and the like), each having distinct performance capabilities. The array's memory 145 can include primary memory (e.g., memory components 155) and cache memory (e.g., global memory 150). The primary memory and cache memory can be volatile or nonvolatile memory. Unlike nonvolatile memory, volatile memory requires power to store data. Thus, volatile memory loses its stored data if the array 105 loses power for any reason. The primary memory can include dynamic (RAM) and the like in embodiments, while cache memory can comprise static RAM, amongst other similar memory types.

In embodiments, a service level agreement (SLA) can define at least one Service Level Objective (SLO) the hosts 114a-n require from the array 105. For example, the hosts 115a-n can include host-operated applications that generate or require data. The data can correspond to distinct data categories, and thus, each SLO can specify a service level (SL) for each data category. Further, each SL can define a storage performance requirement (e.g., a response time and uptime).

Thus, the array's EDS 110 can establish a storage/memory hierarchy that delivers services based on an IO request's related data SL. For example, the EDS 110 can set the hierarchy to include one or more tiers (e.g., subsets of the array's storage/memory) with similar performance capabilities (e.g., response times and uptimes). Thus, the EDS-established fast memory/storage tiers can service host-defined critical and valuable data (e.g., Platinum, Diamond, and Gold SLs). In contrast, slow memory/storage tiers can service host-defined non-critical and lower-importance data (e.g., Silver and Bronze SLs).

In embodiments, the HA 121 can present the hosts 114a-n with logical representations of slices or portions of the array's physical storage devices 116a-n. For example, a logical unit number (LUN) or virtual storage volume can logically represent a collection of addresses spaces from one or more storage devices 116a-n. Further, a track identifier (TID) can logically represent each address space of a LUN. In example embodiments, each TID can logically represent a physical storage track unit.

Accordingly, the hosts 114a-n can include at least one TID in a metadata field of each IO request sent to the array 105. As such, the HA 121 can direct IO requests by reading the TIDs from each IO request's metadata fields. In addition, the HA 121 can also create a searchable data structure, mapping logical storage representations to their related physical storage address spaces.

In embodiments, a host 114a-n can be a containerized application deployed on a container orchestra (CO) platform and can require remote data replication or disaster recovery services (replication services). Accordingly, the array 105 can include a replication manager 111 that delivers replication services accessible through the CSI standard extension (CSI extension). The CSI extension provides containerized applications access to native replication services as described in greater detail herein.

Figure 2:
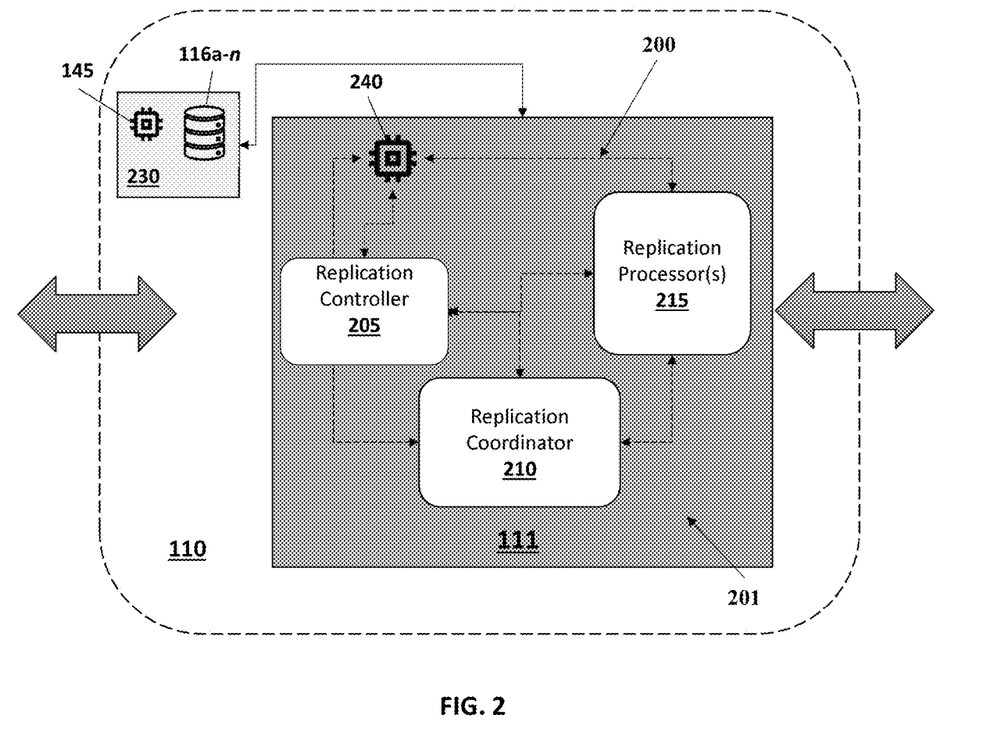
FIG. 2 is a block diagram of a replication manager in accordance with embodiments of the present disclosure.

Regarding FIG. 2, the EDS 110 can include a replication manager 111. The replication manager 111 can include logic or circuitry elements 201 that provide containerized applications data replication or disaster recovery services (replication services). For example, replication manager 111 and its components 201 can deliver the replication services in response to receiving control path messages from a containerized application using protocols defined by a CSI extension. Additionally, the replication manager 111 can include internal communication channels 200 that communicatively couple the elements 101. For example, the channels 200 can comprise Fibre channels, internal busses, or communication modules.

In embodiments, a replication manager element 201 can include a replication controller 205. The controller 205 can provide remote storage array resources for a containerized application on a CO cluster (e.g., a Kubernetes cluster). Further, the controller 205 can enable containerized applications to replicate resources across clusters. Additionally, the controller 205 can establish one or more endpoints configured to receive control path messages from containerized applications. For example, controller 205 can define one or more endpoints to receive a specific storage service request type. Each service request type can be related to a corresponding storage service specified by the CSI extension.

In embodiments, another replication manager element 201 can include a replication coordinator 210. The replication coordinator 210 can include one or more logical or physical ports (not shown) associated with each endpoint the controller 205 establishes. Each logical or physical port can define a communications address (e.g., an 'HTTP' address) for each endpoint. As such, a containerized application can issue specific request types to an endpoint address configured to receive the request type. The replication coordinator 210 delivers the request to a replication processor 215 configured to handle the control path message based on the port receiving the control path message. For example, a replication manager element 201 can include one or more replication processors 215. The replication manager 211 can have distinct sets of replication processors 215. Each processor set can consist of a group of replication processors 215 that perform a particular replication service(s). Accordingly, the replication coordinator 210 can establish a searchable data structure that maps each port to one or more processor sets.

Figure 3:
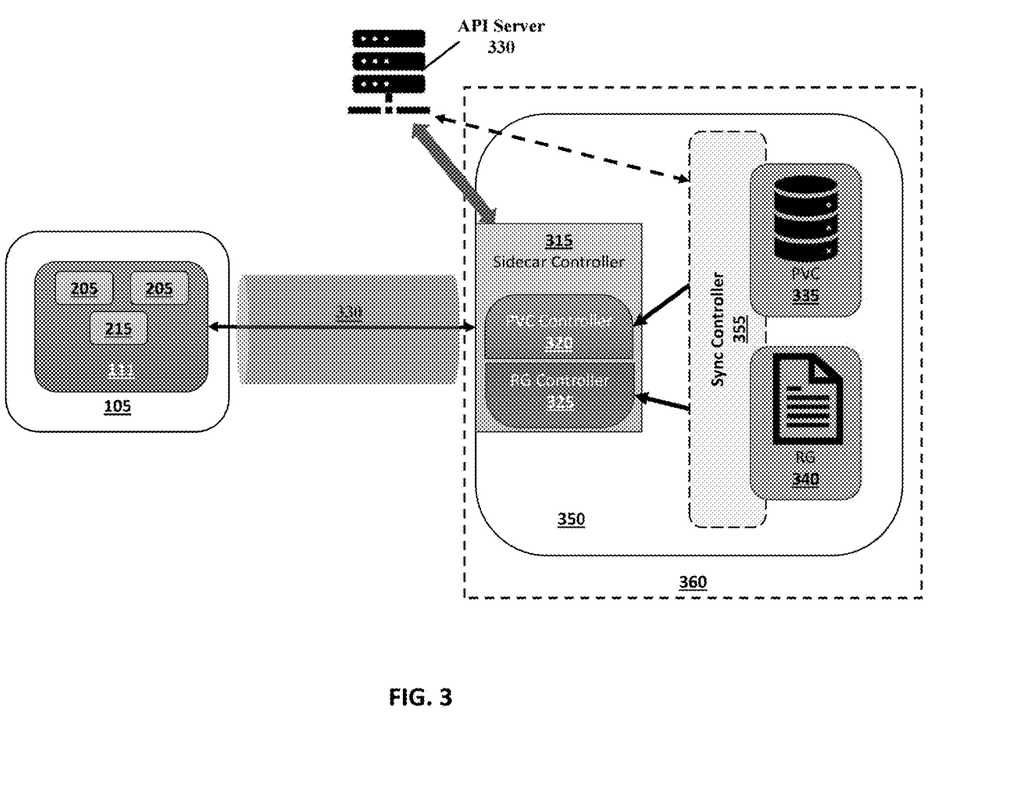
FIG. 3 is a block diagram of a distributed storage area network in accordance with embodiments of the present disclosure.

Regarding FIG. 3, the CSI extension can include specifications, allowing a containerized application residing on a CO cluster 360 to issue control path messages instructing the controller 205 to establish data replication constructs. Additionally, the CSI extension can define an extended CSI protocol, allowing the containerized application 350 to send/receive control path messages with the data replication constructs to one or more endpoints managed by the controller 205, described in greater detail by FIG. 2 above. For example, the controller 205 can receive control path messages from at one of the endpoints via, e.g., a communications channel 330.

In embodiments, the protection group can include parameters for grouping LUNs based on a relationship of their respective replication properties. For example, the replication properties can comprise replication activity properties (e.g., failover), monitoring activity properties, and the like. Further, the protection group can correspond to a storage array's storage group or consistency group. Additionally, the protection group construct can include parameters for information related to a remote array counterpart (e.g., remote system 115 of FIG. 1) to the storage array 105

In further examples, the protection group construct can include an 'ID' parameter for identifying virtual storage volumes defined by the array 105 with substantially similar replication-related properties. For instance, the protection group construct can have metadata fields that store replication configuration information and drivers required for certain replication services. For example, the CSI extension can allow the controller 205 to set one or more of the metadata fields as immutable fields (e.g., fixed and unchangeable). Further, the metadata fields can include one or more of the following fields: driver name field, replication action fields, CO cluster-ID fields, protection group ID fields, protection group attribute fields, storage array ID fields, remote array ID fields, RDF group fields (e.g., physical replication link fields such as an SRDF link (e.g., link 120 of FIG. 1)) between the array 105 and, e.g., a remote system (e.g., remote array 115 of FIG. 1), and replication mode fields defining metro, synchronous, or asynchronous replication modes.

In additional examples, the protection group construct can include status metadata fields. The status fields can comprise state fields, replication link-state fields, last action fields, and condition fields. For example, the state fields can identify a storage resource state (e.g., availability). The replication link-state fields can identify a state of protection groups residing on two or more separate storage arrays. The last action fields and identify the most recent replication operation performed by the storage array 105. Lastly, the conditions fields can provide an array or list of previous replication resource states the containerized application 350 can analyze.

In embodiments, the storage class parameter construct can include a parameter for identifying whether is storage class or storage group is replication enabled. In addition, the storage class construct can include a remote cluster name parameter that identifies a resource synchronization target CO cluster. Further, the storage class construct can include a remote storage class parameter that specifies a storage class of each remote resource, such as a protection volume (PV), created by the array 105. Additionally, the storage class construct can include a retention policy parameter defining a period for retaining records of deleted resources provided to a CO cluster.

In embodiments, the CSI extension can enable the controller 205 to establish one or more endpoints such as one or more of the following: discovery endpoints, create/delete storage volume endpoints, replication action endpoints, monitoring endpoints, support endpoints for announcing protection group support, and driver probe endpoints for determining a readiness driver state. For example, the discovery endpoints can include an endpoint for discovering virtual storage volumes or storage protections groups created by or pre-existing on the array 105. Further, create/delete endpoints can comprise endpoints for creating/deleting a storage protection group. Additionally, the actions endpoints can include endpoints for the containerized application 350 to issue control path messages requiring the array 105 to perform a replication action (e.g., failover, failback, etc.) on, e.g., a protection group. Also, the monitoring endpoints can include endpoints that allow the containerized application 350 real-time or on-demand state information of a protection group from the array 105.

Further, CSI extension can enable the replication controller 205 or the containerized application 350 to a communications channel 330 configured to transmit data packets having the parameter constructs defined by the CSI extension. In embodiments, communications channel 220 can be a dedicated channel (e.g., a WebSocket connection) or an on-demand channel that closes after a response to a request is issued by either the array 105 or application 350.

In embodiments, the containerized application 350 can require a native controller (e.g., a sidecar controller 315 or sync controller 355) to issue messages with the parameter constructs defined by the CSI extension. For example, the containerized application 350 can obtain the software/firmware drivers and controllers via an API server 330 (e.g., a private/public repository).

In embodiments, a sidecar controller 315 can include a PVC controller 320 and an RG controller 325. The PVC controller 320 can enable the containerized application 350 the access PVC-related endpoints. For example, the protection group construct (protection group or replication group) 340 can provide parameter settings, allowing the containerized application 350 to send the array 105 a persistent volume claim (PVC) using the PVC controller 320. In response to receiving the PVC, the replication manager 111 can establish a PVC virtual storage volume 335.

Further, the RG controller 325 can enable the containerized application 350 to access replication activity-relation endpoints. For example, the containerized application 350 can send the array 105 control path messages to create or delete a replication group 340. Additionally, the sync controller 335 can enable the containerized application 350 to periodically fetch a state (e.g., a link-state) of existing replication groups related to the CO cluster 360.

The following text includes details of one or more methods or flow diagrams in accordance with this disclosure. For simplicity of explanation, the methods are depicted and described as a series of acts. However, acts in accordance with this disclosure can occur in various orders or concurrently and with other acts not presented and described herein. Furthermore, not all illustrated acts may be required to implement the methods described by this disclosure.

Figure 4:
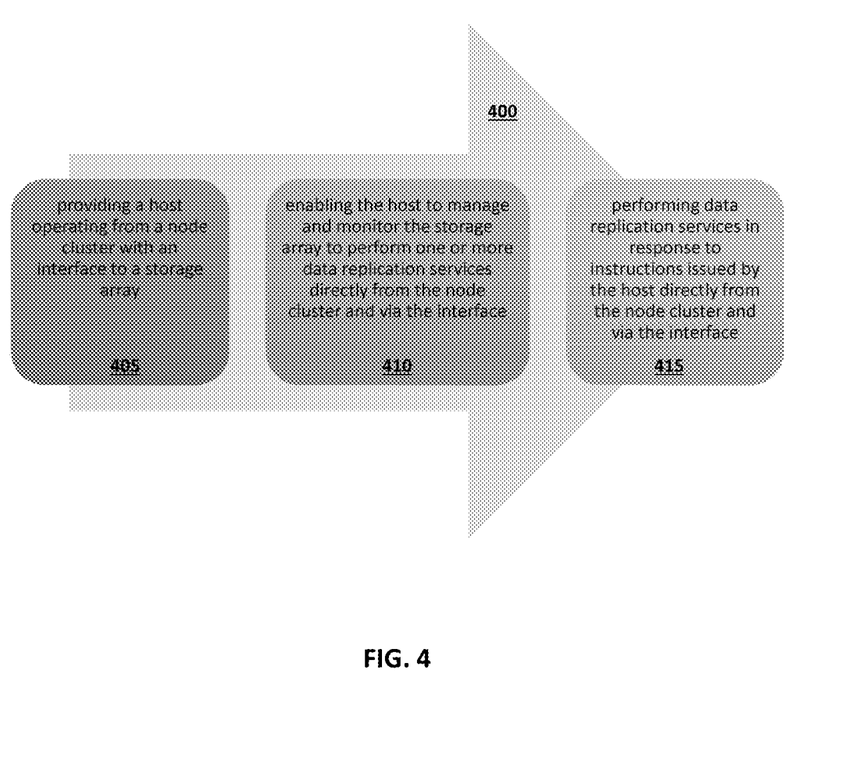
FIG. 4 is a flow diagram of a remote storage replication method in accordance with embodiments of the present disclosure.

Regarding FIG. 4, one or more of the array's components (e.g., components 101 of FIG. 1) can execute the method 400. The method 400 describes elements for enabling storage array-based remote replication from containerized applications. For example, at 405, the method 400 can include providing a host operating from a node cluster with an interface (e.g., an API) to a storage array. The method 400, at 410, can also include enabling the host to manage and monitor the storage array to perform one or more data replication services directly from the node cluster and via the interface. Additionally, at 415, the method 400 can further include performing data replication services in response to instructions issued by the host directly from the node cluster and via the interface. It should be noted that each step of the method 400 can include any combination of techniques implemented by the embodiments described herein.

Using the teachings disclosed herein, a skilled artisan can implement the above-described systems and methods in digital electronic circuitry, computer hardware, firmware, or software. The implementation can be as a computer program product. The implementation can, for example, be in a machine-readable storage device for execution by or to control the operation of, data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implement that functionality.

Processors suitable for the execution of a computer program include, by way of example, both general and special purpose microprocessors and any one or more processors of any digital computer. Generally, a processor receives instructions and data from a read-only memory, a random-access memory, or both. Thus, for example, a computer's essential elements are a processor for executing instructions and one or more memory devices for storing instructions and data. Generally, a computer can include, can be operatively coupled to receive data from or transfer data to one or more mass storage devices for storing data (e.g., magnetic, magneto-optical disks, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated in special purpose logic circuitry.

A computer having a display device that enables user interaction can implement the above-described techniques such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system that includes a backend component can also implement the above-described techniques. The backend component can, for example, be a data server, a middleware component, or an application server. Further, a distributing computing system that includes a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication networks include a local area network (LAN), a wide area network (WAN), the Internet, wired networks, or wireless networks.

The system can include clients and servers. A client and a server are generally remote from each other and typically interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), or other packet-based networks. Circuit-based networks can include, for example, a public switched telephone network (PSTN), a private branch exchange (PBX), a wireless network, or other circuit-based networks. Finally, wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts and combinations of the listed features.

One skilled in the art will realize that other specific forms can embody the concepts described herein without departing from their spirit or essential characteristics. Therefore, in all respects, the preceding embodiments are illustrative rather than limiting the concepts described herein. The appended claims thus recite the scope of this disclosure. Therefore, all changes embrace the meaning and range of equivalency of the claims.

What is claimed is:

1. A method, comprising:
providing a host operating from a node cluster with an interface to a storage array, wherein the interface includes an application programming interface (API);
provisioning the API with access to one or more endpoints configured with access to one or more storage array resources;
configuring the API with one or more storage class operational parameters to issue instructions to the storage array via the one or more endpoints;
using the API and at least one of the one or more endpoints, enabling the host to:
discover a remote volume on the array corresponding to a host generated local volume,
discover a storage protection group,
create at least one new storage protection group, and
delete at least one storage protection group;
enabling the host to manage and monitor the storage array to perform one or more data replication services directly from the node cluster and via the interface; and
causing data replication services to be performed in response to instructions issued by the host directly from the node cluster and via the interface.

2. The method of claim 1, wherein the node cluster is a Kubernetes cluster.

3. The method of claim 1, further comprising:
enabling the host to manage and monitor data replication services across one or more additional node clusters.

4. The method of claim 3, further comprising:
configuring the API to:
augment at least one of the storage array's persistent volumes (PVs) or persistent volume claims (PVCs) with replication metadata, wherein the replication metadata includes at least one of annotations and labels;
synchronize the replication metadata across the one or more additional node clusters; and
bind each PV and PVC with their related replication group.

5. The method of claim 1, further comprising:
configuring a replication construct to group storage array volumes, having related replication parameters; and
provisioning the API with the replication construct.

6. The method of claim 1, further comprising:
using the API and at least one of the one or more endpoints, enabling the host to:
trigger one or more replication actions on the protection group, wherein the one or more replication actions includes one or more of a failover action and a failback action,
monitor a state of the protection group,
notify one or more replication endpoints of support services, and
probe the storage array for a replication status.

7. An apparatus comprising a memory and processor configured to:
provide a host operating from a node cluster with an API to a storage array;
provision the API with access to one or more endpoints configured with access to one or more storage array resources;
configure the API with one or more storage class operational parameters to issue instructions to the storage array via the one or more endpoints;
use the API and at least one of the one or more endpoints, enabling the host to:
discover a remote volume on the array corresponding to a host generated local volume,
discover a storage protection group,
create at least one new storage protection group, and
delete at least one storage protection group;
enable the host to manage and monitor the storage array to perform one or more data replication services directly from the node cluster and via the API; and
cause data replication services to be performed in response to instructions issued by the host directly from the node cluster and via the API.

8. The apparatus of claim 7, wherein the node cluster is a Kubernetes cluster.

9. The apparatus of claim 7, further configured to:
enable the host to manage and monitor data replication services across one or more additional node clusters.

10. The apparatus of claim 9, further configured to:
configure the API to:
- augment at least one of the storage array's persistent volumes (PVs) or persistent volume claims (PVCs) with replication metadata, wherein the replication metadata includes at least one of: annotations and labels;
- synchronize the replication metadata across the one or more additional node clusters; and
- bind each PV and PVC with their related replication group.

11. The apparatus of claim 7, further configured to:
configure a replication construct to group storage array volumes, having related replication parameters; and
provision the API with the replication construct.

12. The apparatus of claim 7, further configured to:
using the API and at least one of the one or more endpoints, enable the host to:
- trigger one or more replication actions on the protection group, wherein the one or more replication actions includes one or more of a failover action and a failback action,
- monitor a state of the protection group,
- notify one or more replication endpoints of support services, and
- probe the storage array for a replication status.

* * * * *